United States Patent
Ma et al.

(10) Patent No.: US 7,230,781 B2
(45) Date of Patent: Jun. 12, 2007

(54) INFORMATION STORAGE SYSTEM, AND A METHOD OF OPERATING IT

(75) Inventors: Yiping Ma, Layton, UT (US); José Castillo, Layton, UT (US); David L. Hall, Salt Lake City, UT (US); Lawrence M. Moon, Layton, UT (US)

(73) Assignee: Iomega Corporation, San Diego, CA (US)

( * ) Notice: Subject to any disclaimer, the term of this patent is extended or adjusted under 35 U.S.C. 154(b) by 97 days.

(21) Appl. No.: 10/718,341

(22) Filed: Nov. 20, 2003

(65) Prior Publication Data

US 2004/0136105 A1    Jul. 15, 2004

Related U.S. Application Data

(60) Provisional application No. 60/439,892, filed on Jan. 13, 2003.

(51) Int. Cl.
  *G11B 27/36* (2006.01)
(52) U.S. Cl. ............................... 360/31; 360/59; 360/53
(58) Field of Classification Search .................. 360/31, 360/53
  See application file for complete search history.

(56) References Cited

U.S. PATENT DOCUMENTS

| | | | | |
|---|---|---|---|---|
| 5,172,381 | A * | 12/1992 | Karp et al. | 360/53 |
| 5,850,321 | A * | 12/1998 | McNeil et al. | 360/246.2 |
| 6,097,559 | A * | 8/2000 | Ottesen et al. | 360/31 |
| 6,215,618 | B1 * | 4/2001 | Anderson et al. | 360/128 |
| 6,266,199 | B1 * | 7/2001 | Gillis et al. | 360/53 |
| 6,404,570 | B1 * | 6/2002 | McNeil et al. | 360/53 |
| 6,411,083 | B1 * | 6/2002 | Inaba | 324/210 |
| 6,469,854 | B1 * | 10/2002 | Gill et al. | 360/53 |
| 6,577,575 | B2 * | 6/2003 | Novotny et al. | 369/71 |
| 6,683,737 | B2 * | 1/2004 | Gong et al. | 360/31 |
| 6,687,071 | B2 * | 2/2004 | Nagai et al. | 360/53 |
| 6,804,072 | B1 * | 10/2004 | Yohda et al. | 360/31 |
| 7,196,859 | B2 * | 3/2007 | Olson | 360/29 |

* cited by examiner

*Primary Examiner*—Andrea Wellington
*Assistant Examiner*—Dismery Mercedes
(74) *Attorney, Agent, or Firm*—Stephen C. Beuerle; Procopio Cory Hargreaves & Savitch LLP

(57) ABSTRACT

An information storage system has structure with a head that can effect information transfers with respect to a storage medium. According to one feature, a control portion monitors a characteristic of information read from the storage medium, and can take action to reduce the likelihood of non-recoverable errors based on the characteristic. According to a different feature, the control portion moves the head to a position adjacent a portion of a surface on the storage medium, waits while moving the head relative to the surface, and then moves the head to another position adjacent a different portion of the surface. According to another feature, the control portion calculates a distance of the head from the surface based on information read from the surface, and determines based on this distance whether the head or the storage medium may fail to satisfy a criteria.

9 Claims, 4 Drawing Sheets

INFORMATION STORAGE SYSTEM, AND A METHOD OF OPERATING IT

This application claims the priority under 35 U.S.C. §119 of provisional application No. 60/439,892 filed Jan. 13, 2003.

TECHNICAL FIELD OF THE INVENTION

This invention relates in general to information storage systems and, more particularly, to techniques for reducing or avoiding the incidence of errors in data stored in and retrieved from information storage systems.

BACKGROUND OF THE INVENTION

Over the past twenty years, computer technology has evolved very rapidly. One aspect of this evolution has been a progressively growing demand for increased storage capacity in memory devices. In order to provide a high storage density at a reasonable cost, one of the most enduring techniques has been to provide a rotatable hard disk with a layer of magnetic material thereon, and a read/write head which is supported for movement adjacent the disk and can transfer information to and from the disk.

In an arrangement of this type, if airborne dust, smoke, vapors or other contaminants are present, they can be attracted to the disk or the head, for example by any electrostatic charge that may be present. Because the head is disposed closely adjacent the disk during normal operation, contaminants on the disk can be transferred to and progressively build up on the head. Eventually, the buildup of contaminants will be sufficient to interfere with the interaction between the head and disk, thereby increasing the error rate until the device will not operate. Also, if a large particle becomes trapped between the head and disk, it can cause damage to the magnetic surface present on the disk. Alternatively, such a trapped particle can cause stored information to be erased, without physical damage to the disk. In this regard, the particle can rub on the disk with sufficient pressure to elevate the temperature of the magnetic coating until magnetic information is thermally disorganized, or in other words erased.

In order to avoid these problems due to contaminants, most hard disk drives have the disk and head disposed within a sealed enclosure, so that the disk and head are not exposed to whatever airborne contaminants may happen to be present externally of the enclosure. This approach works well where the entire hard disk drive device is permanently installed in a computer. In other types of systems, however, a hard disk is provided within a removable cartridge, and it is desirable that the cartridge not include the read/write head.

In this regard, there are advantages to placing a read/write head and its support structure within the drive which receives the cartridge, rather than in the cartridge. For example, a typical user will have several removable cartridges for each drive. Thus, in terms of overall system cost, it is cheaper to provide one head with its support in the drive, rather than to provide several heads with supports which are each disposed in a respective one of many cartridges used with the drive. However, in removable cartridges, there is a problem in regard to keeping the head clean.

More specifically, in order to permit the head from the drive to access the disk within the cartridge, the cartridge is not provided with a sealed enclosure of the type discussed above. Instead, the cartridge is provided with an opening through which the head of the drive can be inserted into the cartridge. In some cases, a movable shutter is provided to obstruct the opening when the cartridge is not disposed in the drive. However, when the cartridge is disposed in the drive, the shutter moves to an open position. Thus, regardless of whether or not a shutter is present, when the cartridge is in the drive, there is an opening which gives the head access to the interior of the cartridge. That opening also necessarily gives ambient air access to the interior of the cartridge, along with any dust, smoke, vapor or other contaminants that are carried by the ambient air.

In order to reduce the incidence of errors, pre-existing systems of this type have typically taken the approach of using a relatively low density for the data stored on the magnetic disk. While this approach has been generally adequate for its intended purposes, it has not been completely satisfactory in all respects. In particular, and as discussed above, there is a progressively increasing demand for progressively higher storage capacities in devices of this type. To achieve this, there is a need to use higher data storage densities, which in turn presents an increased likelihood of errors in data stored on and retrieved from the magnetic disk.

SUMMARY OF THE INVENTION

From the foregoing, it may be appreciated that a need has arisen for improved techniques for minimizing the effects of airborne contaminants in information storage systems. One form of the invention relates to an information storage system which includes an information storage medium and structure operable to effect information transfers with respect to the information storage medium. This form of the invention involves: monitoring a characteristic of information read by the structure from the storage medium, including determining whether the characteristic satisfies a predetermined criteria; and responding to a determination that the characteristic fails to satisfy the predetermined criteria by carrying out a course of action which includes a selected action that reduces the likelihood of non-recoverable errors in data read by the structure from the storage medium.

A different form of the invention relates to an information storage system which includes an information storage medium having an information storage surface with first and second portions, and which includes structure operable to effect information transfers with respect to the first portion of the surface, the structure including a head which is movable relative to the surface. This form of the invention involves: moving the head from a first position spaced from the surface to a second position in which the head is adjacent the second portion of the surface; waiting a predetermined time interval while effecting relative movement of the head and the surface with the head adjacent the second portion of the surface; and thereafter moving the head to a third position in which the head is adjacent the first portion of the surface.

Yet another form of the invention relates to an information storage system which includes an information storage medium having an information storage surface, and structure operable to effect information transfers with respect to the surface, the structure including a head which is movable relative to the surface. This form of the invention involves: calculating a distance of the head from the surface based on information read by the structure from the surface; and determining as a function of the distance whether one of the head and the storage medium is likely to fail to satisfy a predetermined operational criteria.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
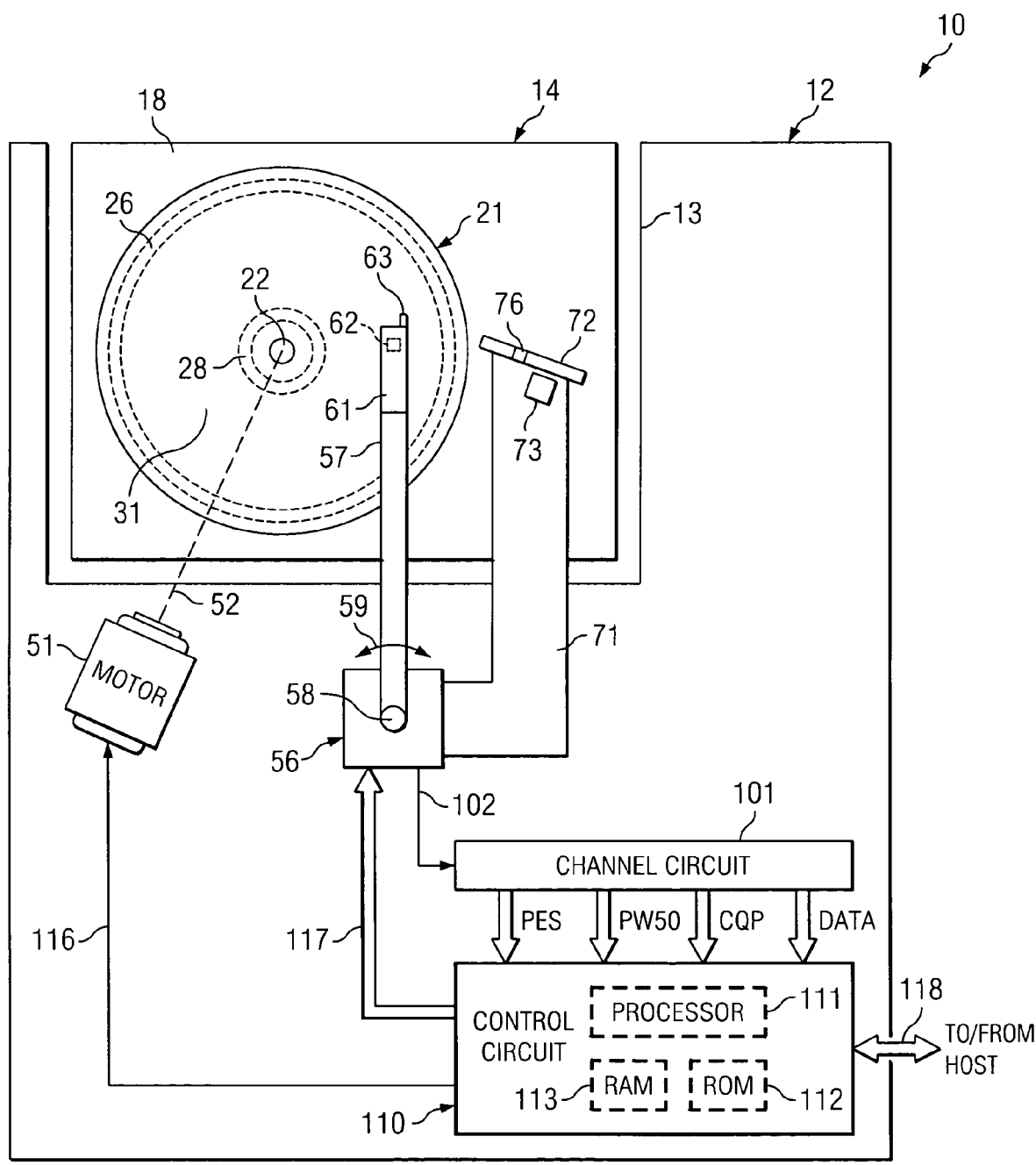
FIG. 1 is a diagrammatic view of an apparatus which is an information storage system, and which embodies aspects of the present invention.

FIG. 1 is a diagrammatic view of an apparatus which is an information storage system 10, and which embodies aspects of the present invention. The system 10 includes a drive 12 having a recess 13 into which an information storage cartridge 14 can be removably inserted. The cartridge 14 includes a housing 18, and on one side of the housing 18 there is an opening, which is not separately illustrated. In FIG. 1, the opening is on the side of the housing 18 nearest the bottom of FIG. 1.

The cartridge 14 has, within the housing 18, a hard disk 21 which is fixedly mounted on a rotable spindle 22. The hard disk 21 includes a substrate, for example made of metal, glass or ceramic. The side of the disk 21 which is visible in FIG. 1 is coated with a magnetic material of a known type. For simplicity and convenience in explaining the present invention, the disk 21 of FIG. 1 is assumed to have this magnetic coating on only one side thereof. However, it will be recognized that the disk 21 could have the magnetic coating on each side, or that there could be several disks 21 all supported on the spindle 22, and each having a magnetic coating on one or both sides.

The magnetic coating on the disk 21 has a radially outer portion 26, which is a circular loading/unloading track. This track 26 is not used for operational data storage, but has servo information of a known type stored along it.

Near the spindle 22, the radially inner portion of the magnetic coating has a further circular portion 28, which is referred to as a reserved track or debug track. The track 28 is not used to store operational user data, but has servo information stored along it. The drive 12 can use the track 28 to store test data and to then read back the stored test data. The portion of the magnetic coating between the tracks 26 and 28 is a region 31 which includes a number of circular tracks that are not separately illustrated. The region 31 stores servo information of a known type for a number of different tracks, and is also used for operational storage of user data.

The drive 12 includes a motor 51. As indicated diagrammatically by a broken line 52, the motor 51 is operationally coupled in a known manner to the spindle 22 in the cartridge 14 when the cartridge 14 is removably disposed in the drive 12. The motor 51 effects rotation of the spindle 22, and thus rotation of the disk 21.

The drive 12 also includes an actuator 56 of a known type, such as a voice coil motor. The actuator 56 has a pivot axle 58. An actuator arm 57 has one end fixedly secured to the pivot axle 58, and the actuator 56 can pivot the pivot axle 58 so as to effect movement of the arm 57 in directions indicated diagrammatically by a double-headed arrow 59. At the outer end of the arm 57 is a suspension 61 of a known type, which supports a magnetic head 62 of a known type. The term "head" is used here to collectively refer to two known elements, which are sometimes referred to separately as the slider and the read/write head. An outwardly projecting tab 63 is provided at the outer end of the suspension 61, for a purpose described later.

The drive 12 has a support leg 71. At its outer end, the leg 71 supports a ramp 72 and a cleaning pad 73. The ramp 72 has a detent 76 at a location spaced inwardly from each end, for a purpose described later. The cleaning pad 73 is made from a material of a known type, and has a textured surface on the side thereof which is visible in FIG. 1.

The actuator 56 can pivot the arm 57 to a position in which the tab 63 is engaging the detent 76 of the ramp 72. In this position, the head 62 is offset from the cleaning pad 73. This is known as the park position of the head 62 and arm 57. The arm 57 and head 62 will be in this park position when the cartridge 14 is not present in the drive 12, and thus will also be in this position as the cartridge 14 is being manually inserted into the recess 13 in the drive 12. As the cartridge 14 is being inserted into the drive 12, the arm 57 and leg 71 move into the housing 18 of the cartridge, through the above-mentioned opening which is provided in one side of the housing 18. When the cartridge 14 has been fully inserted, the actuator 56 can move the arm 57 counterclockwise in FIG. 1, so that the tab 63 leaves the detent 76 and slides down the portion of the ramp 72 which is to the left of the detent 76, until the head 62 is adjacent the magnetic coating on the surface of the disk 21. As the head 62 nears the disk 21, the head 62 will be aligned with the loading/unloading track 26.

As the head 62 nears the disk 21, the motor 51 will be rotating the disk 21 at a normal operational speed. During normal operation, the head 62 does not actually engage the disk 21. Instead, in a known manner, the rotation of the disk 21 induces the formation of an air cushion between the disk surface and the head 62. This air cushion is commonly known as an air bearing. The head 62 floats on the air bearing while reading and writing information to and from the disk, without direct physical contact with the disk. The spacing between the head and disk is commonly referred to as the "fly height" of the head, and in the disclosed embodiment is about 0.01 to 0.015 µm. As the arm 57 is pivoted by the actuator 56, the head 62 moves approximately radially with respect to the rotating disk 21, within a range bounded by a location aligned with the loading/unloading track 26, and a location aligned with the reserved track 28.

The drive 12 includes a channel circuit 101, which is a circuit of a known type. The channel circuit 101 receives at 102 an output signal from the head 62. Based on signals received from the head 62, the channel circuit 101 outputs various different types of information. This information includes a position error signal PES of a known type, as well as data (DATA) which has been read from the disk 21. The channel circuit 101 also outputs information in the form of a known parameter PW50, which represents the pulse width at 50% amplitude of the servo pulses read from the disk 21 by the head 62. The channel circuit 101 also outputs a channel quality parameter CQP, which is a further parameter of a known type. In particular, the channel circuit 101 takes an analog signal representing the data read from the disk by the head 62, samples the signal, and compares the sampled information to an idealized reference. The difference is used to calculate the channel quality parameter CQP in a known manner.

The drive 12 includes a control circuit 110, which receives information from the channel circuit 101, including the position error signal PES, the parameter PW50, the channel quality parameter CQP, and the data information DATA. The control circuit 110 can also receive from the channel circuit 101 some other information which is known in the art but not specifically depicted in FIG. 1, such as automatic gain control (AGC) information for both servo information and data information read from the disk, and information relating to operation of a finite impulse response (FIR) filter in the channel circuit 101.

The control circuit 110 has an output 116 which is coupled to and controls the motor 51, and a further output 117 which is coupled to and controls the actuator 56. The control circuit 110 can be coupled through a host interface 118 to a not-illustrated host computer of a known type. The control circuit 110 includes a processor 111, a read only memory (ROM) 112 that stores static data and a program executed by the processor 111, and a random access memory (RAM) 113 that is used by the processor 111 during program execution to store dynamically changing data.

In any hard disk system, airborne contaminants such as dust or smoke particles can create problems in regard to interaction between the head and the disk. For example, contaminants can build up on the head until they degrade the operation of the head. Also, a medium to large particle (larger than about 0.5 µm) could become lodged between the head and the disk, and then scratch the magnetic coating on the surface of the disk. Therefore, in order to achieve high data storage densities, there is a need to address this problem of airborne contaminants. For many years, the traditional approach was to provide a sealed housing which contained the disk, the actuator, the actuator arm, and the head, so that these components were all completely isolated from airborne particles in the environment external to the housing. However, in the case of a removable data storage cartridge, each cartridge would need to include not only a hard disk, but also an actuator and a magnetic read/write head. Providing these components in each cartridge would significantly increase the cost of each cartridge. Consequently, in the case of a removable data storage cartridge, it is desirable for the actuator and the head to be a part of the drive, and to be provided with access to the hard disk through an opening in the housing of the cartridge. One example of such a system is an information storage system that has been commercially available for several years under the trademark JAZ from Iomega Corporation of Roy, Utah, which is the assignee of the present invention.

In systems of this latter type, the opening in the housing of the cartridge exposes the disk and the magnetic head to airborne contaminants. Consequently, in order to minimize the adverse effects of these airborne contaminants while also providing reliable data storage, it has been necessary in pre-existing systems to keep data storage densities relatively low. For example, pre-existing hard disk systems with a sealed housing often have storage capacities of 20 GB or more, whereas a pre-existing system with an unsealed housing would typically have a storage capacity of only about 1 GB to 2 GB, due to the lower storage densities.

However, there is a progressively increasing demand for greater storage capacities in removable cartridges, as well as an increasing demand for progressively lower prices for the cartridges. Consequently, the present invention relates to techniques that can help minimize the effects of airborne contaminants. In the case of a cartridge having a hard disk in an unsealed housing, storage densities can be achieved that are significantly higher than in pre-existing systems with unsealed housings.

Figure 2:
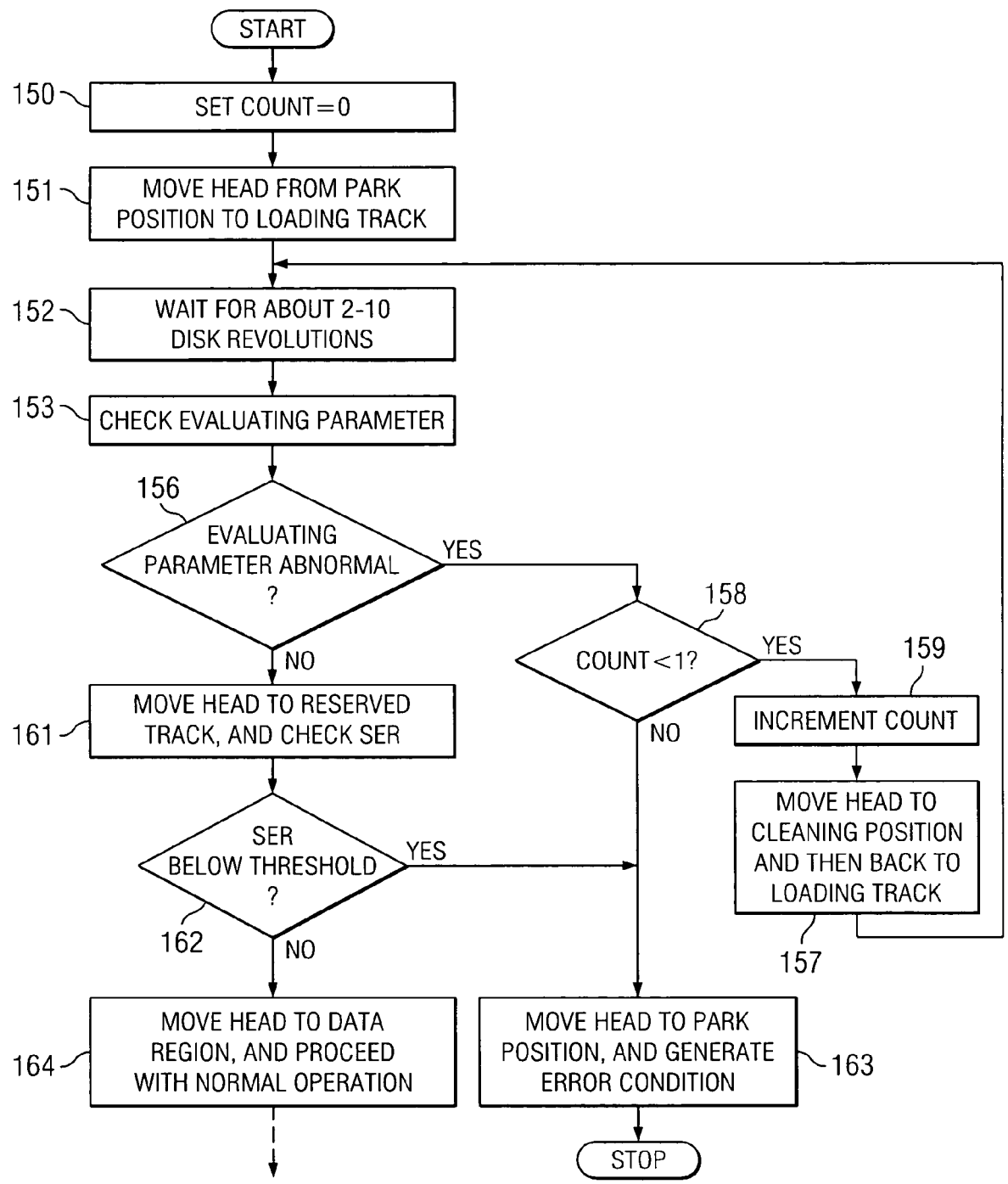
FIG. 2 is a flowchart showing a portion of a program which is executed by a processor in the system of FIG. 1.

In this regard, FIG. 2 is a flowchart showing a portion of a program which is stored in the ROM 112 of FIG. 1, and which is executed by the processor 111. As mentioned above, when the cartridge 14 of FIG. 1 is being inserted into the drive 12, the tab 63 on the support arm 57 is disposed in the detent 76 of the ramp 72, which is the park position of the arm 57 and head 62. The initial portion of the flowchart of FIG. 2 represents a technique for moving the head 62 from its park position to an operational system adjacent the disk 21.

More specifically, in block 150 the control circuit 110 sets a count to zero. Then, in block 151, the control circuit 110 causes the actuator 56 to pivot the arm 57 so that the tab 63 leaves the detent 76 and slides down the left side of the ramp 72, causing the head 62 to approach the loading/unloading track 26 while an air bearing forms between the head 62 and the disk 21. It is possible that, while the head 62 was in the park position, a medium to large airborne particle (larger than about 0.5 µm) may have settled on the head 62, or on the disk 21 at a location along the loading/unloading track 26. As the head 62 is being moved into a position closely adjacent the loading/unloading track 26, such a particle could become trapped between the head 62 and disk 21, and could immediately start to scratch the magnetic coating on the disk. Alternatively, such a trapped particle could cause stored information to be erased, without physical damage to the disk. In this regard, the trapped particle could rub on the disk with sufficient pressure to elevate the temperature of the magnetic coating until magnetic information is thermally disorganized, or in other words erased.

In the embodiment of FIG. 1, such a trapped particle could produce some scratching of the magnetic coating in the region of the track 26, or thermal disorganization of the magnetic coating there, but this will not be catastrophic, because user data is not stored there. However, it is desirable to attempt to dispose of any such particle before the head 62 and the trapped particle are moved away from the track 26 to the region 31 where user data actually is stored.

Therefore, after the head 62 has been moved to a position adjacent the track 26 in block 151, the control circuit 110 proceeds to block 152, where it waits for approximately 2 to 10 revolutions of the disk 21. Then, at block 153, the control circuit 110 checks for any abnormality in a selected evaluating parameter, such as the position error signal PES. It would alternatively be possible at this point to check for abnormalities in each of two or more parameters, such as two or more of the position error signal (PES), the servo automatic gain control (AGC) signal, information from a finite impulse response (FIR) filter, or any other suitable parameter. However, for clarity and simplicity, the following discussion assumes that only a single evaluating parameter is used, which is the PES.

At block 156, if the evaluating parameter is found to be normal, it means that there is probably no trapped particle between the head 62 and disk 21, and block 157 is skipped. On the other hand, if the evaluating parameter is found to be abnormal, then a particle may be trapped between the head 62 and disk 21, and the control circuit 110 proceeds to block 158. In block 158, the control circuit 110 checks to see if the count is still zero, or in other words whether this is the first pass through block 156. If so, then control proceeds to block 159, where the control circuit 110 increments the count. Then, in block 157, the control circuit 110 takes some appropriate corrective action.

In particular, in block 157, the control circuit 110 causes the actuator 56 to pivot the arm 57 clockwise in FIG. 1, so that the tab 63 slides back up the ramp 72, to and beyond the position of the detent 76, until the head 62 is engaging the cleaning pad 73. To the extent that any particle may have become trapped between the head 62 and disk 21, the particle will typically be carried by the head 62 to the cleaning pad 73, where it will be removed by the cleaning pad. After the head 62 has been cleaned by the cleaning pad 73, it will promptly be returned to a position adjacent the disk 21 before any further particle can settle along the loading/unloading track 26. In particular, the control circuit 110 will promptly cause the actuator 56 to pivot the arm 57 counterclockwise in FIG. 1, so that the tab 63 slides back along the ramp 72 until the head 62 is again adjacent the track 26, with an air bearing formed therebetween. Once a proper fly height has been established between the head and disk, the geometry of the head is such that it would be very rare for a medium to large particle to become trapped between the head and disk.

Control then returns to block 152 to check again for the existence of a problem. When control again reaches block 156, if it is determined that there is still a problem, then control proceeds to block 158, where it will be determined that the count is now greater than zero. Consequently, the control circuit 110 will proceed to block 163, where it moves the arm 57 and head 62 to the park position, in which the tab 63 engages the detent 76. The control circuit 110 then transmits a notice of an error condition through the host interface 118 to the not-illustrated host computer. The control circuit 110 then ceases normal operation, in an attempt to halt operation of the system 10 before any non-recoverable hard error occurs.

Referring again to block 156, if it is determined that the evaluating parameter is normal, then control proceeds to block 161. If the evaluating parameter is determined to be normal during the first pass through the loop, then it means there was no problem. On the other hand, if the evaluating parameter is determined to be normal during the second pass through the loop, then it means that there was a problem but that the cleaning operation carried out in block 157 resolved it.

Referring now in more detail to block 161, the control circuit 110 of the drive 12 carries out a further operation which is intended to compensate for airborne contaminants. In this regard, and as mentioned above, airborne contaminants can build up on the head 62 over time, causing problems such as read errors, or instability in the spacing between the head and disk.

There are two types of read errors. One type is known as a recoverable or soft error, due to the fact that error correction techniques of a known type can be used to correct the error. The other type of error is known as an unrecoverable or hard error, which is an error that cannot be corrected, even through the use of error correction techniques. The frequency of occurrence of soft errors is the soft error rate (SER), which can also be referred to as the soft bit error rate (SBER). The frequency of occurrence of hard errors is the hard error rate (HER), which can also be referred to as the hard bit error rate (HBER).

Figure 3:
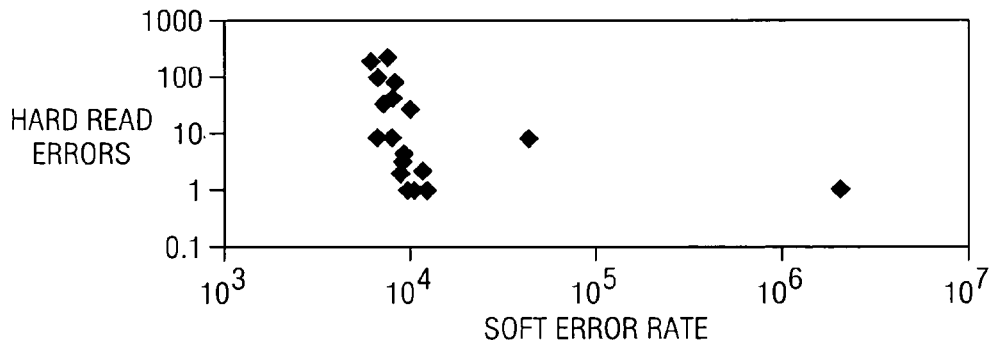
FIG. 3 is a graph showing hard read errors in relation to a soft error rate for the system of FIG. 1.

FIG. 3 is a graph presenting empirical data for the system of FIG. 1, showing the number of hard read errors in relation to the soft error rate in units of bits per error. (This is the reciprocal of the units used by others in the industry, which is errors per bit). It will be noted that the number of hard read errors increases exponentially as the soft error rate approaches $10^4$. According to a feature of the present invention, the soft error rate (SER) of the system 10 of FIG. 1 is constantly monitored by the control circuit 110, and an error condition is generated if the SER approaches a predetermined threshold value, which is $10^4$.

More specifically, with reference to block 161 in FIG. 2, the control circuit 110 causes the actuator 56 to move the arm 57 until the head 62 is aligned with the reserved track 28 at the radially inner portion of the disk 21. One reason that the track 28 is located near the radially inner portion of the disk 21 is that, in a typical zone recording scheme, the track 28 has the highest data storage density, and thus will tend to have the highest susceptibility to errors. When the head 62 is aligned with the track 28, the control circuit 110 uses the head 62 to write test data to the track 28, to read back this test data, and to then check this test data for soft errors, in order to calculate a soft error rate SER. Then, at block 162, the control circuit 110 checks to see if the SER is below a predetermined threshold, which in the disclosed embodiment is $10^4$. If the SER is found to be below the threshold, then the control circuit 110 proceeds to block 163, where as discussed above it moves the arm 57 and head 62 to the park position, in which the tab 63 engages the detent 76. The control circuit 110 then transmits a notice of an error condition through the host interface 118 to the not-illustrated host computer. The control circuit 110 then ceases normal operation, in an attempt to halt operation of the system 10 before any non-recoverable hard error occurs.

Although the disclosed embodiment checks the soft error rate SER at block 161, it would alternatively be possible for the control circuit 110 to check any of a number of other parameters. As one example, the control circuit could alternatively check the position error signal (PES). Consequently, the discussion here of checking the SER is merely one example of a suitable parameter.

Referring again to block 162, if the control circuit 110 determines that the calculated soft error rate SER is not below the selected threshold, then it proceeds to block 164. In block 164, the control circuit 110 moves the head 62 to the data region 31 between the tracks 26 and 28, and proceeds with normal operation involving reading and/or writing of operational user data.

As discussed above, blocks 153 and 156 in FIG. 2 are used to determine whether to execute or skip the block 157. As an alternative, blocks 153 and 156 could be omitted from the flowchart of FIG. 2, such that control would proceed from block 152 directly to block 157. In other words, the head 62 would be moved into operational alignment with the loading/unloading track 26, the system would wait for about 2 to 10 revolutions of the disk 21, and then the head would be unconditionally moved to the cleaning position in which it engages the cleaning pad 73.

With reference to block 161, the flowchart of FIG. 2 shows that the soft error rate SER is promptly checked each time the head 62 is moved into operational alignment with the disk after spending a period of time in the park position. However, the soft error rate SER can be checked at other times during system operation, either in addition to or in lieu of the check shown in block 161. For example, the SER could be checked just before the head is unloaded from the disk, or could be checked using operational user data, as that user data is being read from the data region 31 of the disk 21 in response to a user request. As still another alternative, a check of the SER could be carried out during an idle condition of the system 10. For example, when the head 62 is in its park position, the control circuit 110 could briefly move the head away from the park position in order to write and read test data to and from the reserved track 28, and could then calculate the SER based on this test data.

In FIG. 2, if the detected soft error rate SER is found to be below the threshold at block 162, the control circuit 110 essentially shuts down system operation at block 163. Alternatively, however, the control circuit 110 could take some other course of action. For example, the control circuit 110 could (1) prevent a user from writing data, (2) allow a user to write data only in a write-with-verify mode, or (3) initiate recovery activities such as head cleaning in order to improve the error rate performance.

In blocks 161-163 of FIG. 2, an error condition is generated after checking the soft error rate SER at just one radius of the disk, which is the radius associated with track 28. Alternatively, however, when the SER is found to be below the threshold at any radius, the SER could be checked again at a different radius, and then the error condition would be generated only if the SER was found to be below the threshold at each such radius.

A further consideration relates to the fact that the blocks 161 and 162 involve evaluation of the soft error rate SER. It would alternatively be possible to check for a degradation of system operation using some parameter other than the SER, such as the channel quality parameter CQP which was discussed above in association with FIG. 1.

Figures 4A, 4B:
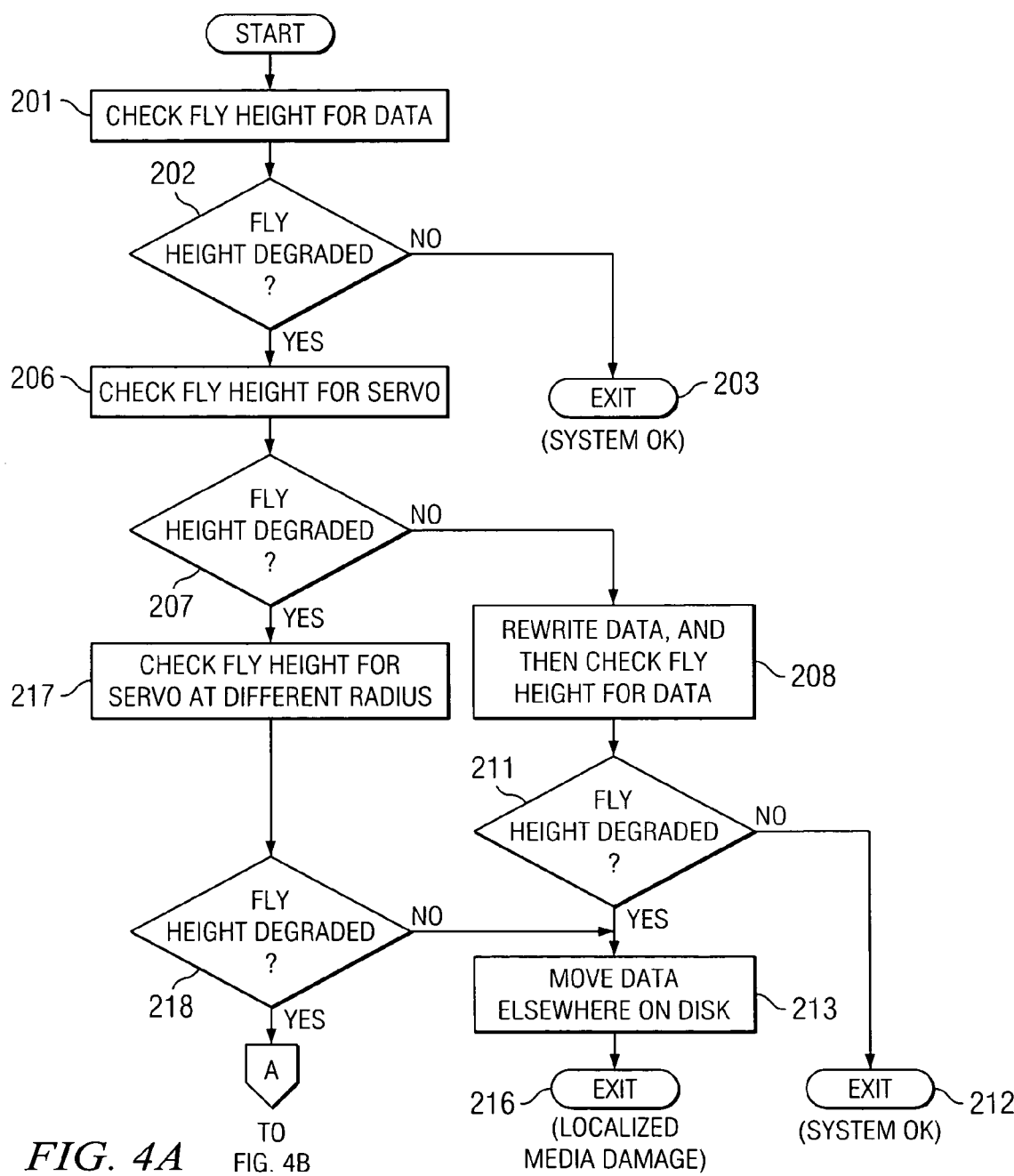
FIG. 4 is a flowchart showing a procedure used by a control circuit in the system of FIG. 1 in order to differentiate between different types of problems.
Figure 4B:
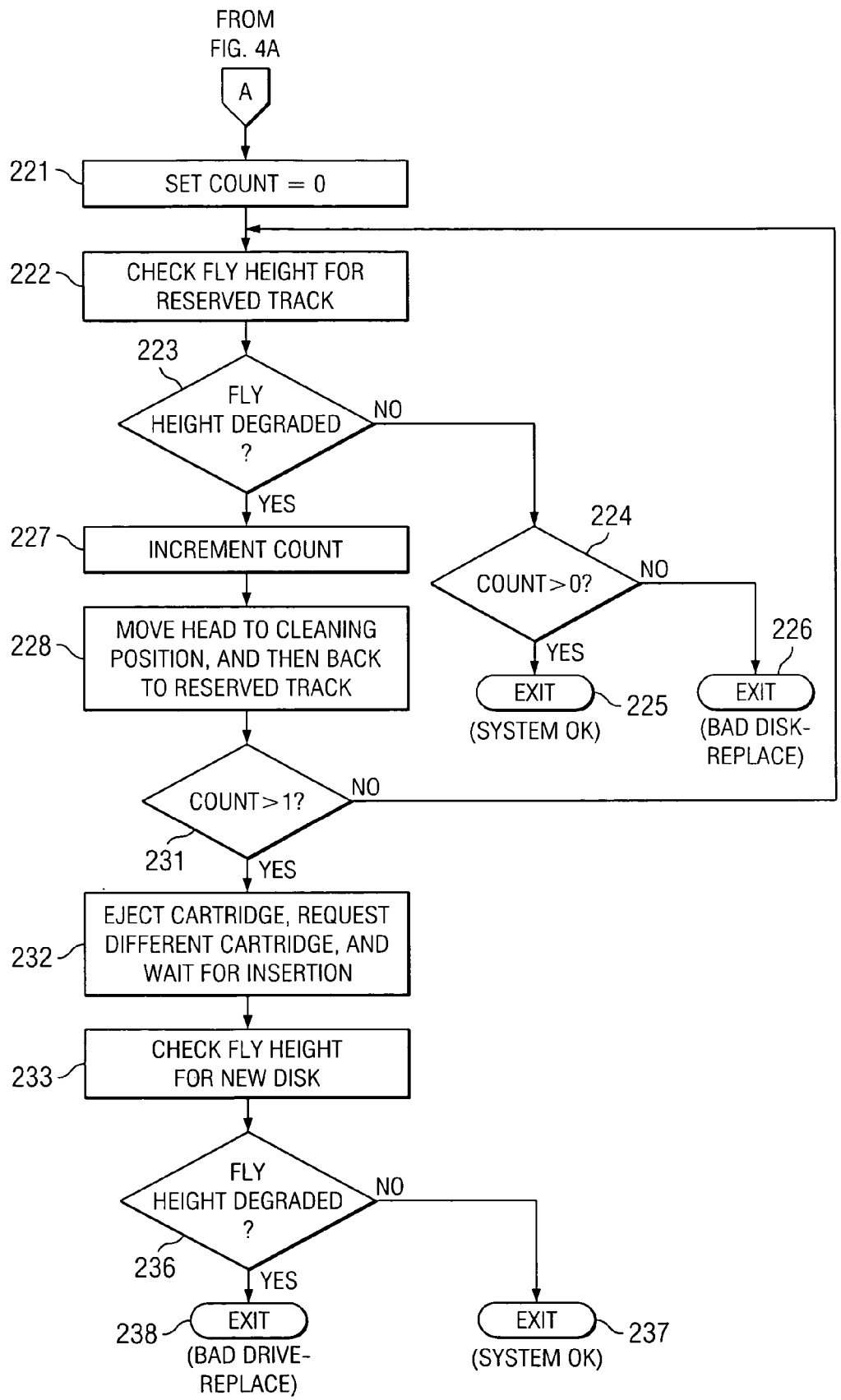

As discussed above, airborne contaminants can build up on the head 62 in a manner which could degrade system operation and cause a loss of user data. On the other hand, degradation of system operation could also occur as a result of other factors, such as damage to the magnetic coating on the hard disk. In the past, it has been difficult to differentiate between problems which are due to degradation of the head and problems which are due to other factors, such as media damage. FIG. 4 is a flowchart showing a procedure used by the control circuit 110 of FIG. 1 to differentiate between these various types of problems.

More specifically, and with reference to FIG. 4, the procedure begins at block 201, where the control circuit 110 checks the fly height of the head 62 while the head is reading user data from the data region 31 of the disk. In the disclosed embodiment, the fly height is determined by checking a parameter received from the channel circuit 101. There are a variety of different parameters which could be used as the evaluating parameter. For example, the evaluating parameter could be the channel quality parameter (CQP), automatic gain control (AGC) information for data or servo information read from the disk, information relating to what the finite impulse response (FIR) filter in the channel circuit 101 is currently doing to attempt to equalize pulse shapes read from the data sectors, soft error rate (SER) information, or the PW50 information. Persons skilled in the art will recognize that, as to some of these parameters, the evaluation would involve a comparison of the current value to some form of reference value, which could be either a predetermined value, or a prior measured value of the parameter which was saved at some previous point in time. As to the PW50 information, an estimate of PW50 can be calculated using known information about the drive, and using information obtained from the FIR filter which is commonly referred to as tap values. In this regard, the FIR information applied to a gray code in a servo field would yield PW50 for the servo field. A similar approach can be used to obtain PW50 information for a data field.

After determining the fly height at block 201, the control circuit 110 proceeds to block 202, where it evaluates whether this fly height is degraded, or in other words whether the fly height falls outside what is considered a normal operational range for the fly height. If no problem is detected, then the control circuit 110 exits the procedure of FIG. 4 at block 203, representing a determination that the system does not appear to have a significant problem.

On the other hand, if it is determined at block 202 that the fly height is degraded, then the control circuit 110 is faced with the possible existence of a problem, and takes further action to investigate. In particular, at block 206, the control circuit 110 checks the fly height while the head is reading servo information from the data region 31 of the disk. At block 207, the control circuit 110 evaluates whether this particular fly height is degraded from a normal condition. If not, then the control circuit 110 proceeds to block 208, where it takes the data which was checked at 201, rewrites this data to the disk, and then determines the fly height again while it is reading back this rewritten data. At block 211, the control circuit 110 checks to see whether the fly height determined from the rewritten data is degraded. If not, then the control circuit 110 exits the procedure at 212, representing a determination that the problem has been resolved.

On the other hand, if it is determined at block 211 that the fly height for the rewritten data is degraded, then the control circuit 110 assumes that the disk has a localized defect, and at block 213 it moves the data to some other location on the disk. The control circuit 110 then exits the procedure of FIG. 4 at block 216, representing a determination that the disk has localized media damage, and that the problem has been resolved by moving the data to a different part of the disk, and by mapping the damaged part of the disk out of the definition which identifies portions of the disk that are available to a user.

Looking again at block 207, if the control circuit 110 determines that the fly height for the servo information is degraded, it proceeds to block 217 to carry out further investigation. In block 217, the control circuit 110 checks the fly height for servo information at a radius on the disk which is different from the radius used in block 206. Then, at block 218, if the fly height for the further servo information is found to be acceptable, the control circuit 110 concludes that the portion of the disk used in blocks 201 and 206 has localized media damage, and proceeds to block 213 in order to move the data from that portion of the disk to a different portion of the disk, in the manner discussed above.

On the other hand, if the control circuit 110 determines at block 218 that the fly height associated with the further servo information is abnormal, then it proceeds to block 221, where it sets a count to zero. Then, in block 222, it moves the head 62 to the reserved track 28, writes test data to the reserved track, and then reads back that test data in order to check the fly height at the reserved track 28. If the fly height for the reserved track 28 is found to be acceptable at block 223, then the control circuit 110 proceeds to block 224, where it checks to see if the count is greater than zero. If so, then the control circuit 110 exits the procedure of FIG. 4 at block 226 while generating an error condition which indicates that the disk is bad and should be replaced. In response to this error indication, a user might transfer all of the user data in the cartridge 14 to a new and identical cartridge, and then discard the problematic cartridge 14. On the other hand, if the count is found to be greater than zero in block 224, then control proceeds to block 225, which is discussed in more detail below.

Referring again to block 223, if the control circuit 110 determines that the fly height is degraded as to the reserved track 28, then at block 227 it increments the count, and proceeds to block 228. At block 228 the control circuit 110 causes the actuator 56 to move the head 62 until it engages the cleaning pad 73, and to then move the head 62 back to the reserved track 28. Then, at block 231, the control circuit 110 checks to see whether the count is greater than 1, or in other words whether blocks 222-223 and 227-228 have already been executed twice. If they have been executed only once, then the control circuit 110 returns to block 222, in order to execute these blocks again. This time, if the fly height is found to be acceptable at block 223, it means the cleaning operation was successful. Therefore, since the count will now be found to be greater than zero in block 224, the control circuit will exit the procedure of FIG. 4B at block 225, representing a determination that the problem has been resolved.

Referring again to block 231, if it is determined that the count is greater than one, or in other words that there is a problem which was not resolved by a cleaning operation at block 228, then the control circuit 110 proceeds to block 232. In block 232, the control circuit 110 generates a message through the host interface 118, which causes the host computer to ask the user to replace the cartridge 14 with a different cartridge. The control circuit 110 waits for the insertion of the replacement cartridge, and then proceeds to block 233, where it checks the fly height for the new disk. Then, at block 236, it evaluates whether the fly height determined for the disk in the new cartridge is acceptable. If the fly height is acceptable, then the control circuit 110 exits the procedure of FIG. 4 at block 237, representing a determination that the problem was in the original cartridge 14 rather than in the drive 12, and has been resolved. Alternatively, if it is found at block 236 that the fly height is not acceptable, then the control circuit 110 exits the procedure of FIG. 4 at block 238, while notifying the host computer that the drive 12 is problematic and should be replaced. The problem with the drive 12 may, for example, be due to degradation of the operation of the head 62 in the drive 12.

The present invention provides a number of advantages. One such advantage is realized by monitoring the soft error rate and by taking action when appropriate in order to avoid hard errors that can result in the loss of user data. The action taken can be preventing a user from storing data in the system, permitting the user to store data only in a write-with-verify mode, or initiating recovery activity such as cleaning the read/write head. The soft error rate can be checked just after the head is loaded onto the disk, just before the head is unloaded from the disk, during a transfer of user data to or from the disk, or during an idle state of the system.

Yet another advantage is realized where the soft error rate is checked at a radius of the disk where data storage densities are highest and where error rate degradation is thus more likely to occur. Still another advantage is realized where the soft error rate is checked at two or more different radial locations on the disk. An advantageous alternative is to use a parameter other than the soft error rate, such as a channel quality parameter.

A different advantage is realized where, each time the head is moved to a position adjacent the disk, it is first moved to a position aligned with a predetermined portion of the disk where no user data is stored, and is maintained there for a period of time. It is also advantageous if the head is then subjected to a cleaning operation before it is moved to the portion of the disk where user data is stored. This head cleaning can be carried out unconditionally, or based on a condition such as whether there is an abnormality in an operational parameter derived from information read by the head from the disk. This operational parameter can be a position error signal derived from servo information read by the head from the disk.

A different advantage is realized where a procedure is provided to determine whether a degradation in system operation is due to a problem with the storage medium in the cartridge or a problem with the drive which includes the head. It is advantageous where the procedure involves evaluating a characteristic such as the operational spacing between the head and the disk at one or more locations, based on data and/or servo information read from the disk, and includes using that evaluation to determine what corrective action to take. The corrective action may involve rewriting data back to its current location on the disk, moving the data to a different location on the disk, replacing the cartridge containing the disk with a different cartridge and disk, and/or replacing the drive which includes the read/write head.

Although one embodiment has been illustrated and described in detail, it will be understood that various substitutions and alterations are possible without departing from the spirit and scope of the present invention, including aspects of the invention which are encompassed by the following claims.

What is claimed is:

1. A method of operating an information storage system comprising:

positioning a read head to a first position over a loading track;

comparing a value of a first evaluation parameter to a first predetermined level;

when the first evaluation parameter exceeds the first predetermined level, moving the read head to a cleaning position and then back to the first position;

when the value of the first evaluation parameter does not exceed the first predetermined level, positioning the read head to a second position over a reserved track, and comparing a value of a second evaluation parameter to a second predetermined level; and when the value of the second evaluation parameter exceeds the second predetermined level, moving the read head to a park position and generating an error signal.

2. The method of claim 1, further comprising redetecting the value of the first evaluation parameter after moving the read head back to the first position.

3. The method of claim 1, wherein the first evaluation parameter is a position error signal.

4. The method of claim 1, wherein the second evaluation parameter is fly height.

5. The method of claim 1, further comprising moving the read head for normal operation when the value of the second evaluation parameter does not exceed the second predetermined level.

6. The method of claim 1, wherein the second evaluation parameter is the soft error rate.

7. The method of 1, wherein said reserved track includes a radially inner portion of a disk.

8. A method of operating an information storage system comprising:

moving a read head from a park position to a loading track of a removeable magnetic disk;

evaluating a first parameter;

when the first parameter is evaluated at an abnormal level, moving the read head to a cleaning position and then back to the loading track;

when the first parameter is evaluated at a normal level, moving the read head to a reserved track of the removeable magnetic disk and evaluating a second parameter; and when the second parameter is evaluated above a predetermined threshold, moving the read head to the park position and generating an error condition.

9. A method of operating an information storage system comprising:

moving a read head from a park position to a loading track on a radially outer portion of a removeable magnetic disk, the removeable magnetic disk disposed within a cartridge;

evaluating at least two parameters including a position error signal, a servo automatic gain control, and information from a finite impulse response filter;

when at least one of the at least two parameters is evaluated at an abnormal level, moving the read head to a cleaning position and then back to the loading track;

when the at least two parameters are evaluated at a normal level, moving the read head to a reserved track on a radially inner portion of the removeable magnetic disk and calculating a soft error rate; and when the calculated soft error rate is above a predetermined threshold, moving the read head to the park position and generating an error condition.

* * * * *